Figure 1:
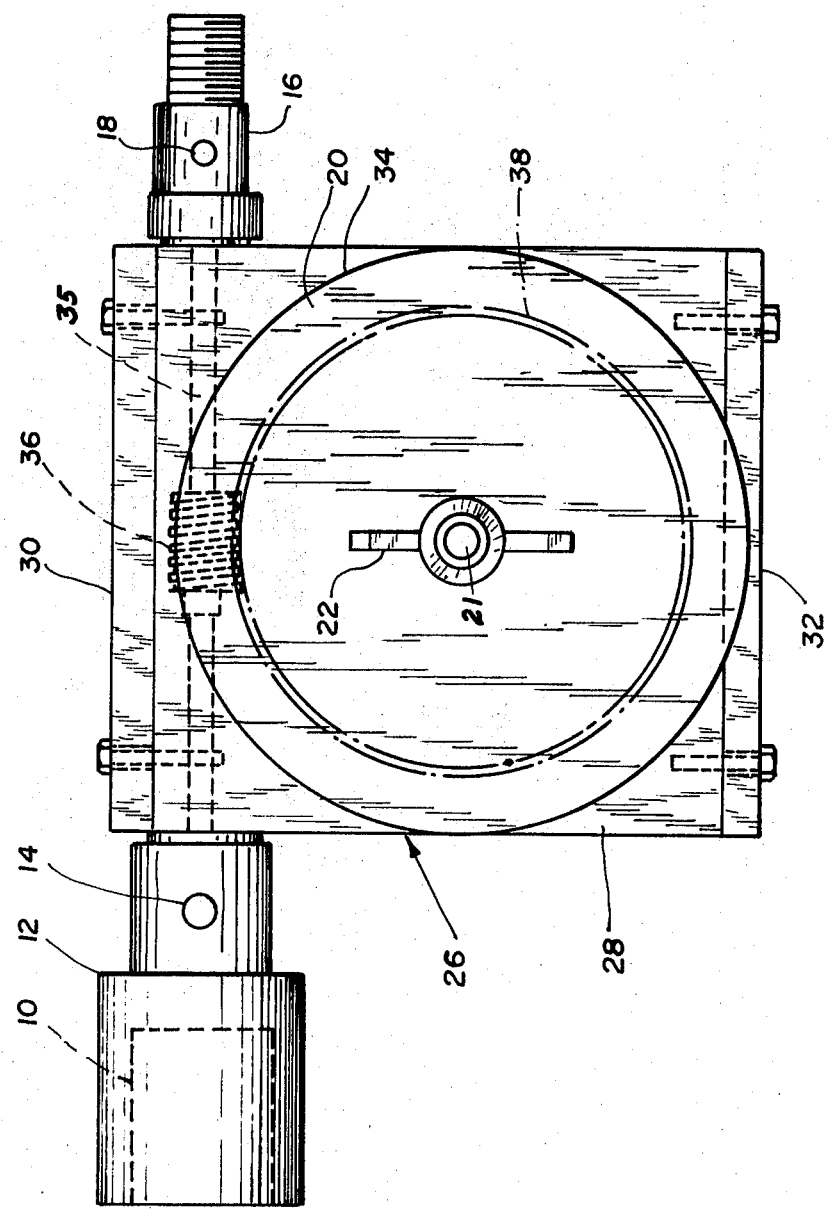

United States Patent
Brown

[15] 3,704,684
[45] Dec. 5, 1972

[54] ATTACHMENT FOR MEASURING COORDINATES IN A MILLING MACHINE

[72] Inventor: Burton D. Brown, 23 Woodland Road, Wyomissing Hills, Pa. 19610

[22] Filed: Aug. 18, 1971

[21] Appl. No.: 172,681

[52] U.S. Cl. ............... 116/115.5, 33/125, 33/189, 74/813, 90/11 R, 235/103
[51] Int. Cl. ........................................... B23q 17/00
[58] Field of Search............116/115, 115.5, 124, 133; 74/812, 813, 815, 825, 848; 90/11 R, 11 E, 15.1, 21, 58; 33/125, 189; 235/103; 318/18

[56] References Cited

UNITED STATES PATENTS

| | | | |
|---|---|---|---|
| 1,506,461 | 8/1924 | Svensson et al. | 235/103 |
| 2,692,085 | 10/1954 | Gibbs | 235/103 |
| 2,711,935 | 6/1955 | Miles | 116/115.5 X |
| 3,000,469 | 9/1961 | Froehlich | 74/813 X |
| 3,239,941 | 3/1966 | Ahmer | 33/189 |
| 3,566,827 | 3/1971 | Moseley | 116/115.5 |

*Primary Examiner*—Louis J. Capozi
*Attorney*—William J. Ruano

[57] ABSTRACT

This invention relates to an attachment which can be secured to a milling machine for measuring X-Y coordinates by removing the handle which is connected to a coordinate screw and attaching the handle on the other end of the attachment. Thus as the handle at its new location is rotated, it will not only drive the coordinate screw but will also drive a scale wheel which accurately indicates the extent of rotation of the coordinate screw.

2 Claims, 2 Drawing Figures

PATENTED DEC 5 1972 3,704,684

INVENTOR
BURTON D. BROWN
BY
William J. Ruano
his ATTORNEY

ATTACHMENT FOR MEASURING COORDINATES IN A MILLING MACHINE

This invention relates to machining apparatus and a quick, reliable method of locating points of intersecting X and Y coordinates. These points represent machining positions as specifically described by the blueprint under consideration to enable speedy stepping of holes and milling cuts.

In the past, the tradesman was obliged to clean the work piece, paint it with layout blue and measure off X-Y points with the aid of a combination square or surface gauge. He would then proceed to "prick" an eruption in the metal as near to the lay-out center as possible. The work piece was then drilled (reamed, counterbored, etc.) at this eruption and the accuracy was dependent on his ability in alignment, using center punch while locating. The results were not satisfactory for modern industrial requirements.

When the above method proved unsatisfactory, the tradesman then turned to machines that would resolve the human error. The jig boring machine is so designed to locate centers within 0.0001 error. Unfortunately, the cost of the jig boring machine prohibits many small shops to possess it and even large industries use the jig bore in limited quantity. The machines are, therefore, used only for jig, fixture, gauge and machine elements that require very close work.

The tradesman has an alternative to use another popular, less expensive machine, known in the trade as a vertical milling machine. This machine works, in principle, the same as the jig boring machine, but is far less accurate. However, for 90 percent of toolroom machining it is sufficient for accuracy within 0.001 or 0.002 inches. This machine is fitted with two screws which move a work table along the X-Y planes according to the manipulation of the operator. Each coordinate screw has a dial which follows the rotation of the screw and is graduated to a least unit marking of 0.001 inch. Every revolution of the screw causes the dial to rotate 0.200 inch, so that the operator, by dividing 0.200 into his dimension and then rotating the number of turns on the lead screw, can bring the machine to a fixed point as described by the blueprint. Again, this method is tedious and depends on the accuracy of the operator on counting and on his arithmetical abilities.

An object of the present invention is to overcome the above-named disadvantages of commonly used apparatus and methods and to assist the operator in his quest to find centers as before described.

A more specific object of the invention is to provide a novel and heretofore not know attachment, whereby the operator may easily attach it to the existing machine (or any other machine, as the need dictates) and read directly from the blueprint, into the workpiece, all necessary centers for hole or milling location. This is simply accomplished by reading directly from the attachment to the machine. Such X-Y coordinate determining attachment enhances the job scope of small shops who are unable to afford a jig boring machine. It also adds an excellent instructional media for vocational trade programs who also lack the funds to buy more expensive equipment.

The X-Y determining attachment of the present invention will further fulfill the needs for the growing tendency toward metric measurement, as a simple change of calibration on the reading dial of the attachment will convert an American (English System Machine) to the popular metric system machine.

Another object of the invention is to provide a simple constructed X-Y coordinate determining attachment of very low cost, which will make it a tool well within the reach of the humblest machine shop and greatly reduce the need for high priced operators whose skill is dependent upon previous methods.

Figure 2:
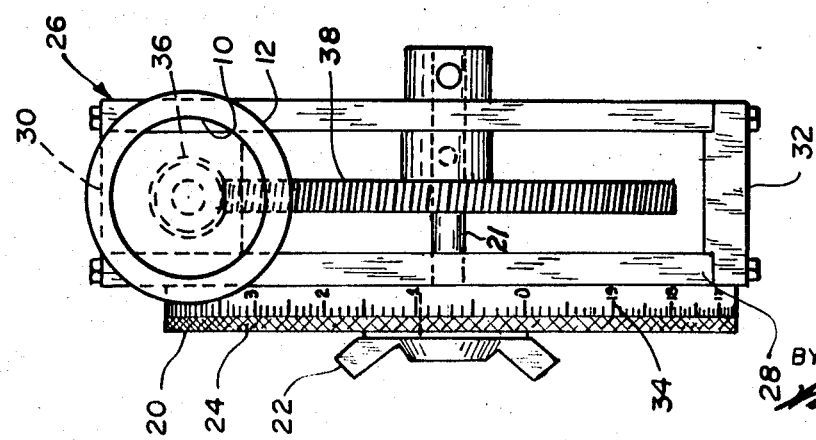

Other objects and advantages will become more apparent from a study of the following description, taken with the accompanying drawing wherein:

FIG. 1 is an elevational view of an attachment embodying the present invention; and, FIG. 2 is an end view thereof as viewed from the right of FIG. 1.

Referring more particularly to the drawing, FIGS. 1 and 2 show an X-Y coordinate determining attachment for insertion in a vertical milling machine or the like.

When the machine manipulating handle (not shown) is removed from the vertical milling machine, it is replaced with the adapter shaft 12 and locked on the lead screw of the mill (not shown) with the nut that heretofore had clamped the manipulating handle to the milling machine.

The attachment, shown in FIGS. 1 and 2, is now "plugged-into" the machine (not shown) by direct alignment of the attachment drive shaft 35 to adapter shaft 12 and its bore 10 and then held in place and driven by the pin 14.

When the operator wants to move through a predetermined measurement, he fixes the removed manipulating milling machine handle (described above) of the mill to connector 16 and locks it in place by pin 8. The attachment now becomes a part of the mill and all motion of the lead screw of the mill be be transmitted through drive shaft 35, worm 36 and worm wheel 38 and shaft 21 to the scale wheel 34 when clamped by wing nut 22 screwed to a threaded portion of reduced diameter of shaft 21. When wing nut 22 is unscrewed and unclamped, scale wheel 34 can be freely rotated relative to shaft 21 to enable zero setting with the index marking on housing 28.

If the operator must move through a distance of 4.843 inches, he merely loosens the wing nut 22 and turns scale wheel 34 with the aid of the knurled portion 24 on the periphery of the scale wheel and aligns the "0" on the wheel to a witness mark or zero setting on the housing assembly 28 nearest the scale wheel. He then locks wing nut 22 and scale wheel 34 will rotate immediately with any motion the operator applies to the lead screw via the manipulating lever.

Considering the before-mentioned dimension of 4.843 inches, the operator cranks the machine, observing that the scale wheel 34 begins measuring through its graduated drum (graduations are preferably in 0.100 increments with inch measurements stamped on as well) until he reaches the number 4 graduation. He continues cranking until he has passed through 8 of the 0.100 graduations, giving him a total movement of the table of 4.800 inches. He now looks down to the dial on the milling machine (graduated in 0.001 increments) and cranks 43 of the increments on the machine dial. He has effectively moved the machine 4.843 inches accurately without either mental or physical aids in the shortest possible time. After machining at this spot, the operator again refers to his blueprint and moves the necessary dimension to continue his job.

The attachment shown in FIGS. 1 and 2 functions mechanically in this manner:

When connector 16 is rotated worm 36 transmits positive motion to worm wheel 38 which rotates scale wheel 34. Connector 16 is rotated by the machine handle connected thereto (not shown), rotates drive shaft 35. The same rotary motion of connector 16 transmits through drive shaft 35 to the lead screw of the machine via adapter shaft 12 thus causing the milling machine and scale wheel 34 of the attachment to move in harmony, simultaneously.

Thus it will be seen that I have provided a unique attachment for a milling machine that simplifies the accurate "stepping" of holes and milling cuts; that ordinary procedures demand laying out and center punching holes before drilling, whereas with the attachment of the present invention, the hole location can be done quite simply by:

1. resolving all dimensions from a common edge on the blueprint;
2. setting the maching at "0" on the machine dial (by using edge finders or other accepted methods)
3. connecting the attachment to the machine and setting it to "0";
4. stepping off holes by cranking the attachment desired dimension as shown on the dial thereof.

Although my attachment has been adapted to the Bridgeport Milling Machine, it can be used instead, on any mill, lathe, shaper, or any other machine that has accurate dial and screw methods of moving the work piece.

While I have illustrated and described a single specific embodiment of my invention, it will be understood that this is by way of illustration only and that various changes and modifications may be contemplated within the scope of the following claims.

I claim:

1. An attachment for insertion between the handle and coordinate screw of a milling machine or the like for determining coordinates in right angular relationship, comprising a drive shaft having a socket at one end for attachment to said lead screw to replace said handle after removal, and attaching means at the other end for attachment to said removed handle, said drive shaft including a worm, a housing surrounding said worm and including a worm wheel driven by said worm, and a calibrated circular scale detachably clamped to said worm wheel and cooperating with a reference zero setting on said housing immediately adjacent said scale.

2. An attachment as recited in claim 1 wherein said scale has a knurled portion for facilitating turning relative to said housing, and including a wing nut for detachably clamping said scale to said drive shaft in zero setting relationship with said housing.

* * * * *